(No Model.) 6 Sheets—Sheet 1.

S. HENRY.
CIGAR BUNCHING MACHINE.

No. 372,414. Patented Nov. 1, 1887.

WITNESSES: J. Staib, Chas. H. Smith

INVENTOR Simon Henry
BY Lemuel W. Serrell
ATTORNEY (No Model.)  6 Sheets—Sheet 3.

S. HENRY.
CIGAR BUNCHING MACHINE.

No. 372,414. Patented Nov. 1, 1887.

WITNESSES:
J. Stait
Chas. H. Smith

INVENTOR
Simon Henry
BY Lemuel W. Serrell
ATTORNEY (No Model.) 6 Sheets—Sheet 4.
S. HENRY.
CIGAR BUNCHING MACHINE.
No. 372,414. Patented Nov. 1, 1887.
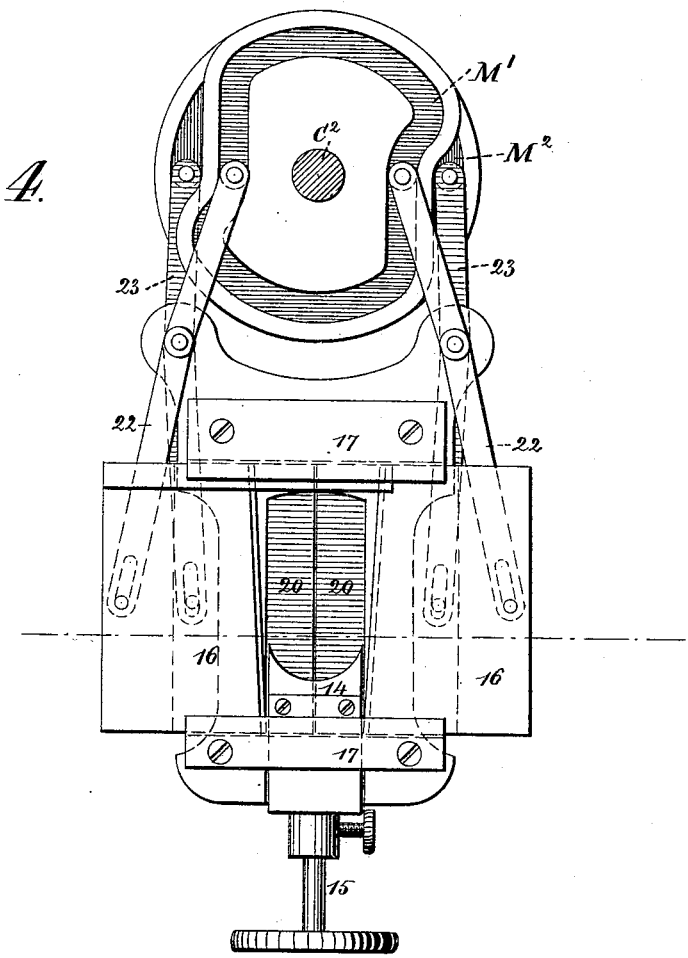
Fig: 4.
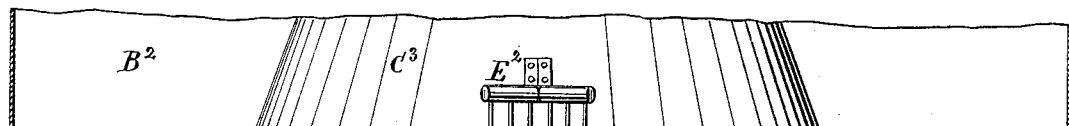
Fig: 5.
WITNESSES:
INVENTOR
Simon Henry
BY Lemuel W. Serrell
ATTORNEY
N. PETERS, Photo-Lithographer, Washington, D. C.

(No Model.) 6 Sheets—Sheet 5.
S. HENRY.
CIGAR BUNCHING MACHINE.
No. 372,414. Patented Nov. 1, 1887.
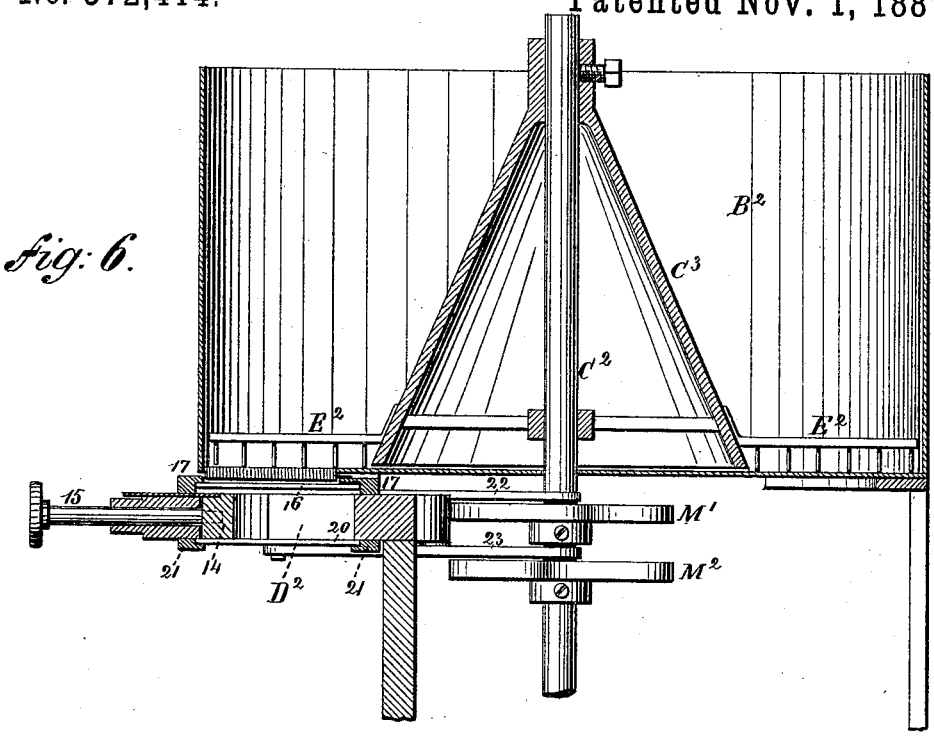
Fig: 6.
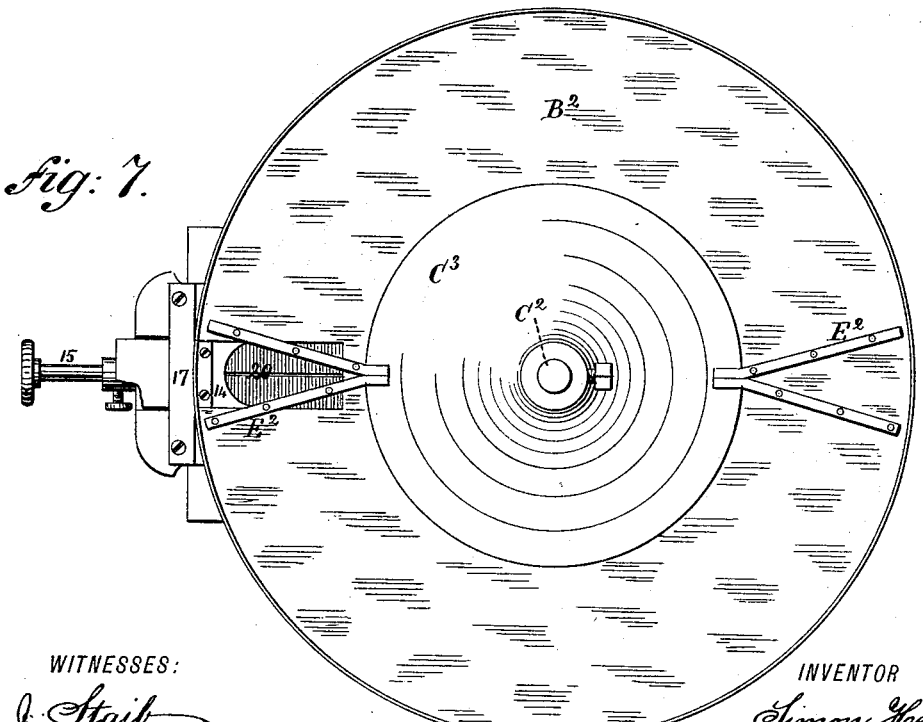
Fig: 7.
WITNESSES:
J. Staib
Chas. H. Smith
INVENTOR
Simon Henry
BY Lemuel W. Serrell
ATTORNEY
N. PETERS, Photo-Lithographer, Washington, D. C.

(No Model.) 6 Sheets—Sheet 6.

S. HENRY.
CIGAR BUNCHING MACHINE.

No. 372,414. Patented Nov. 1, 1887.

WITNESSES:
J. Staib
D. P. Core

INVENTOR
Simon Henry
BY Lemuel W. Serrell
ATTORNEY

N. PETERS, Photo-Lithographer, Washington, D. C.

UNITED STATES PATENT OFFICE.

SIMON HENRY, OF BROOKLYN, NEW YORK.

CIGAR-BUNCHING MACHINE.

SPECIFICATION forming part of Letters Patent No. 372,414, dated November 1, 1887.

Application filed August 22, 1887. Serial No. 247,519. (No model.)

*To all whom it may concern:*

Be it known that I, SIMON HENRY, of Brooklyn, in the county of Kings and State of New York, have invented an Improvement in Cigar-Bunching Machines, of which the following is a specification.

In my present improvements the tobacco in a short or granulated condition is placed in a hopper, and there is a measure that receives the tobacco and from which it is discharged into a mold that approximates in shape to the finished cigar, and this mold is used to transfer the tobacco to the rolling-machine that puts on the binder, and from this the cigar is placed in the mold for shaping and drying. When the rolling-machine is operated, the supplying and measuring devices are brought into action automatically, and the tobacco is discharged from the mold by a plunger that is moved by a treadle.

Figure 1:
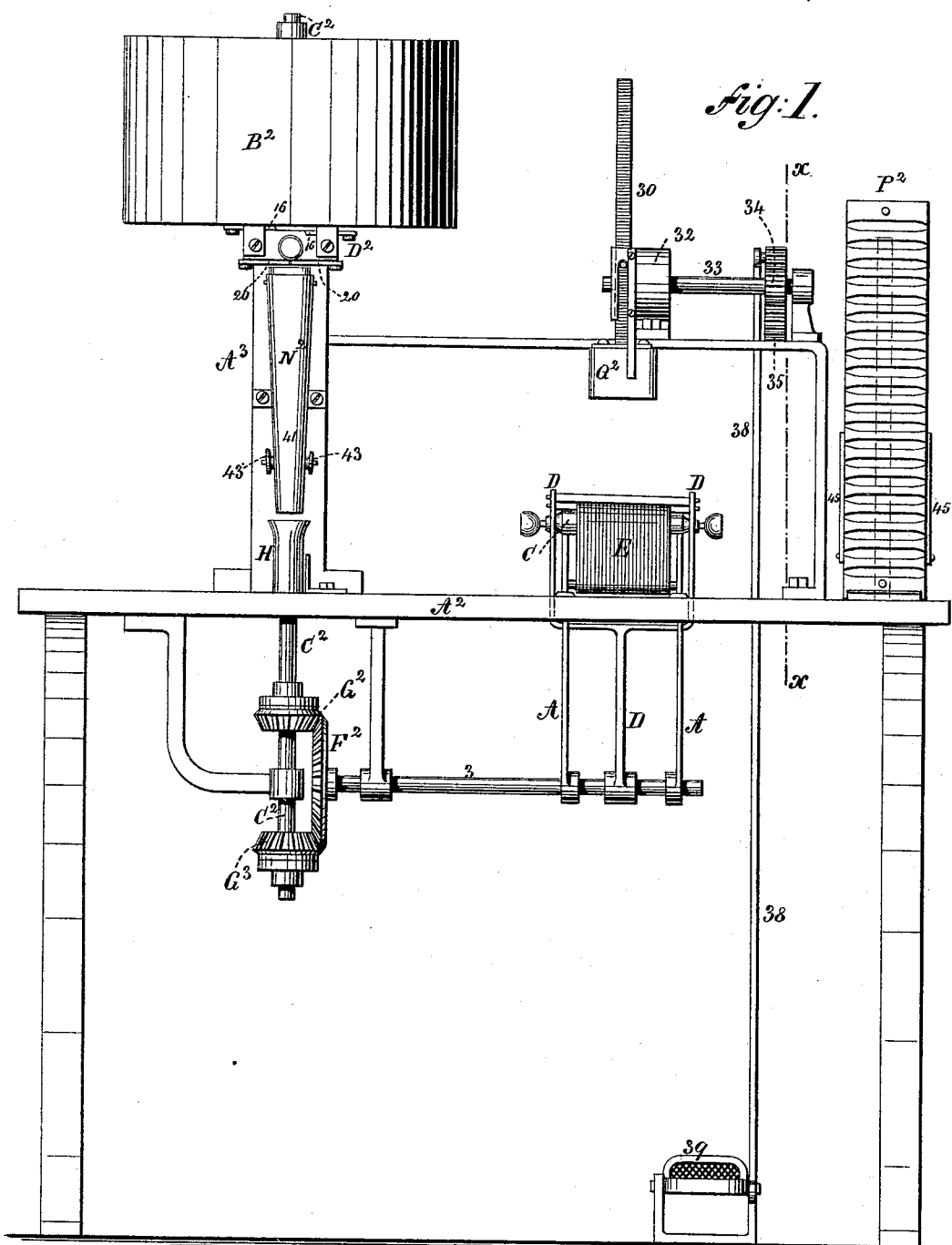
Figure 2:
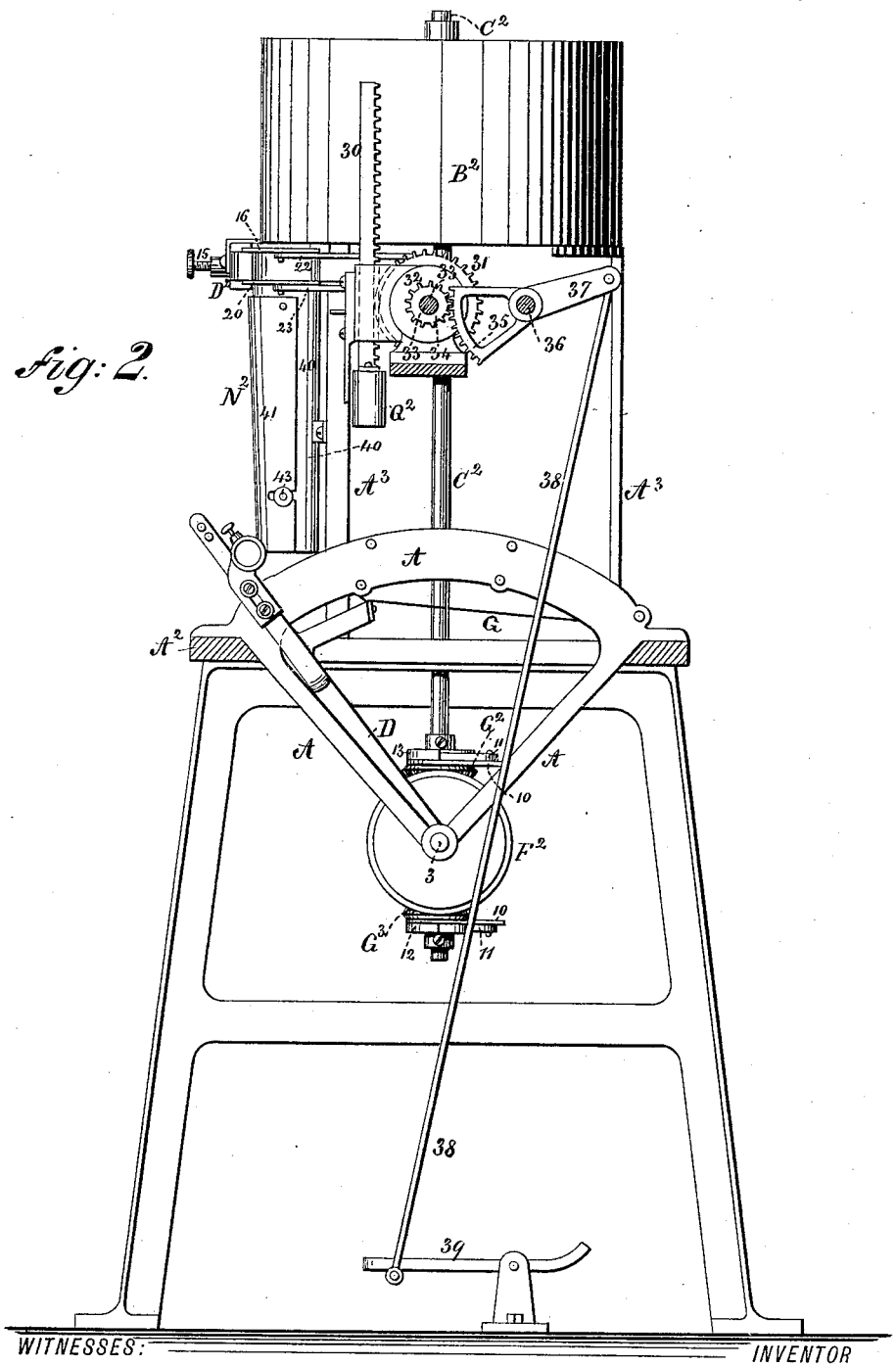
Figure 3:
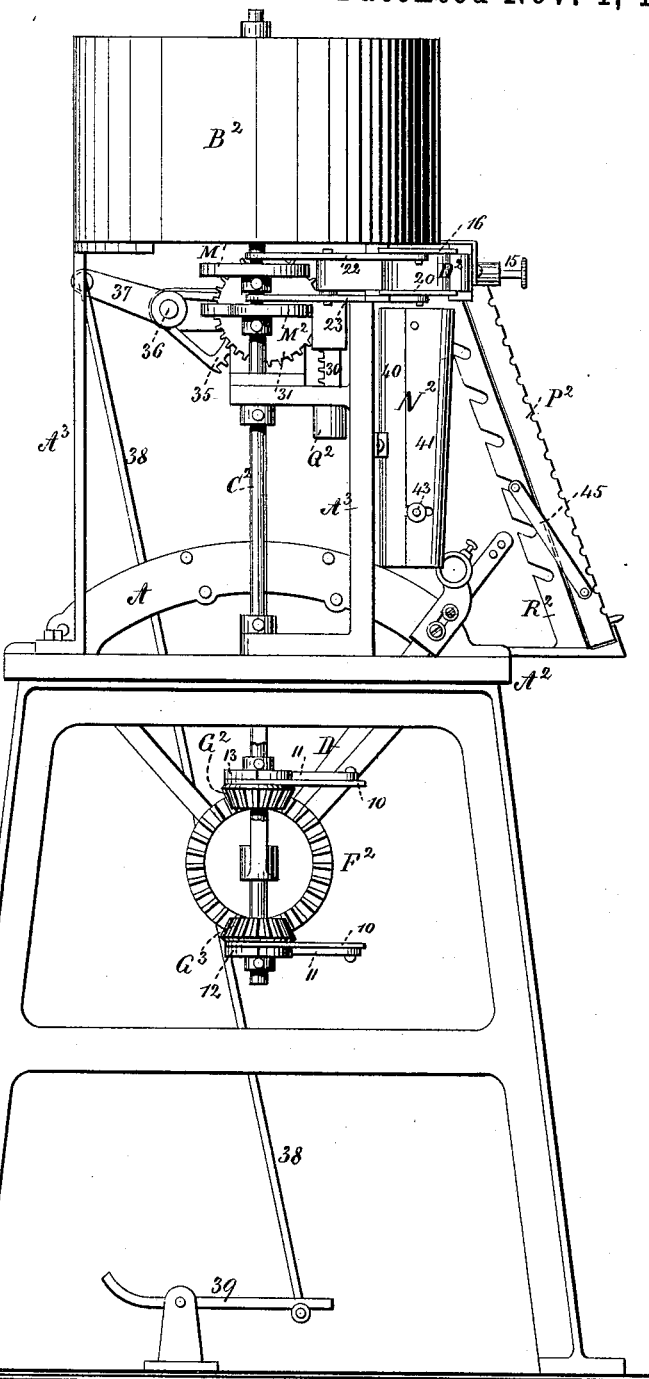
Figure 13:
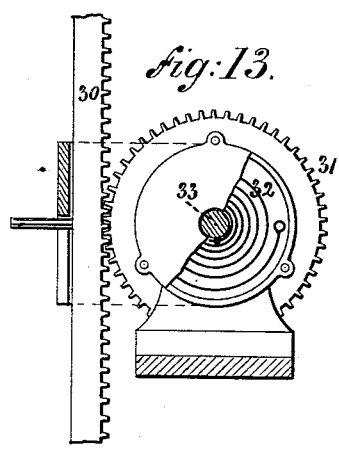
Figure 8:
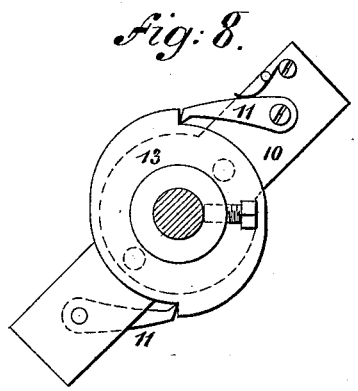
Figure 14:
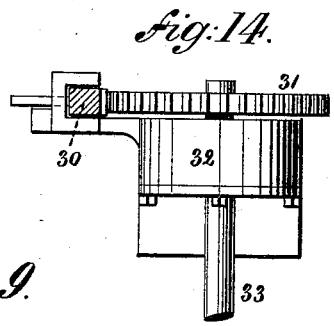
Figure 10:
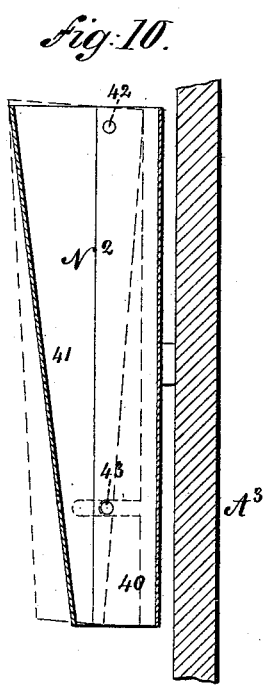
Figure 9:
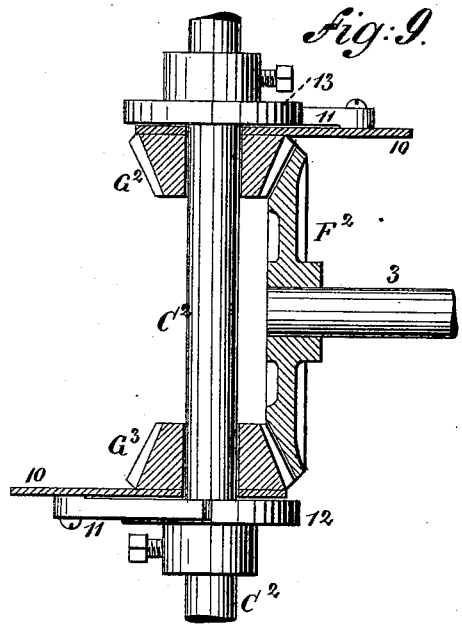
Figure 11:
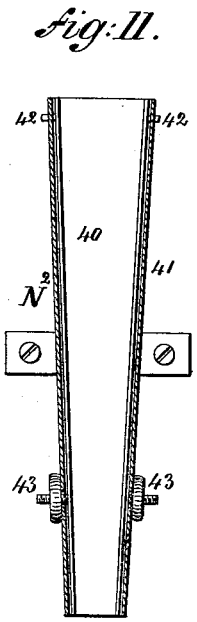
Figure 12:
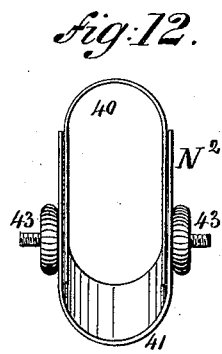

In the drawings, Figure 1 is an elevation of the machine. Fig. 2 is an end view of the same, with the frame in section, at the line $x\ x$. Fig. 3 is an elevation at the opposite end of the machine to Fig. 2. Fig. 4 is a detached plan view of the measuring device in larger size. Fig. 5 is a vertical section of the same. Fig. 6 is a vertical section through the hopper and mold. Fig. 7 is a plan of the same. Fig. 8 is a plan of the ratchets and pawls. Fig. 9 is an elevation of the pawls and ratchets and section of the gearing for moving the agitators. Figs. 10 and 11 are vertical sections of the variable chute for conveying the tobacco from the measure to the mold, and Fig. 12 is a plan view of the same. Fig. 13 is an elevation, partially in section, and Fig. 14 is a plan view, of the spring-barrel and rack that operate the discharge-plunger.

The cigar-bunching machine made use of by me is similar to that shown in my Patent No. 360,691, granted April 5, 1887. The stationary frame A is attached to the table $A^2$, and the frame D and roller C are moved by hand in rolling the binder around the filler-tobacco, the apron E and moving-belt G being the same as in said patent.

The mold H is of any suitable character. It, however, may correspond to that shown in my Patent No. 368,832, granted August 23, 1887. These parts are represented for showing the manner in which my improvements are combined and used with them.

Upon the bed $A^2$ are standards $A^3$, supporting the hopper $B^2$, which is in the form of a circular vessel, for receiving the tobacco in a granulated or short condition. The vertical shaft $C^2$ is central within this vessel $B^2$, and is provided with a cone, $C^3$, within the vessel to keep the tobacco out toward the measure $D^2$, hereinafter described, and there are stirrers or agitators $E^2$, in the form of arms, with downwardly-projecting teeth, that are connected with the cone and travel close above the bottom of the hopper $B^2$. As the frame D is swung back and forth in rolling the binders around the filler-tobacco, the shaft 3 is rocked, and, by the bevel gear-wheel $F^2$ thereon, gives motion to the bevel-pinions $G^2\ G^3$, that are loose upon the shaft $C^2$ and are provided with plates 10, to which the pawls 11 are pivoted, and upon the shaft $C^2$ are ratchet-wheels 12 13, permanently attached. The pinions and pawls turn the shaft $C^2$ intermittently, a half-revolution being given to the same as the frame D and roller C are pushed back in rolling the filler, and the other half-revolution is given as the roller C is drawn forward again. These movements cause the agitators $E^2$ to operate in the hopper, and also open, close, and discharge the measure $D^2$ for the tobacco.

Beneath an opening in the bottom of the hopper $B^2$ is the measure $D^2$, and within this measure is the end piece, 14, with a projecting rod, 15, by means of which the capacity of the measure can be varied by moving the end piece within the measure to lengthen or shorten the same.

Above the measure are the cut-off plates 16, the ends of which are supported in the guide-slides 17 above the mold and beneath the bottom of the hopper $B^2$, and the edges of these cut-off plates 16 that come together are beveled and slightly inclined, so as to act as shears in separating any tobacco that may be between them, and beneath the measure $D^2$ are the sliding discharge-doors 20, supported in the guides 21, and there are levers 22 23 and shell-cams $M'\ M^2$, that operate upon the levers 22 23 to move the cut-off plates 16 and the discharge-doors 20, and the shapes of the cams $M'\ M^2$ are such that the cut-off plates 16 are first brought together after the measure $D^2$ has been filled with tobacco, for the purpose of separating the tobacco in the measure from that in the hopper, and immediately that this is done the doors 20 are opened and the tobacco falls down through the variable chute $N^2$ into the mold H. This operation takes place as the roller C is pushed backwardly, and then as the roller C is pulled forward the shaft $C^2$ receives its other half-revolution, and the discharging-doors 20 are first closed, and then the cut-off plates 16 are immediately opened, so that the tobacco in the hopper is free to pass down into and fill the measure $D^2$, ready for the operations to be repeated. The attendant now takes the cigar-filler that has been rolled by the operation of the roller C and apron E, and places such cigar-filler into one of the molds $P^2$ in the usual manner, and then he places upon the apron E the leaf-tobacco binder, as usual, and lifts the mold H off the table $A^2$ and places it beneath the plunger $Q^2$ and above the apron E, and this plunger $Q^2$ is brought down, as hereinafter described, and presses the filler-tobacco down out of the mold H and upon the apron E, ready for rolling the same up into the binder, as before described, and he then returns the mold H to its place upon the table $A^2$, beneath the chute $N^2$, ready to receive the next filler-tobacco as it is discharged from the measure $D^2$ through the chute $N^2$ as the next filler is rolled by the roller C and apron E, as before mentioned.

The plunger $Q^2$ is provided with a rack, 30, with teeth gearing into the wheel 31 of the spring-barrel 32, and upon the shaft 33 there is a pinion, 34, into which the segmental rack 35 gears, and this rack is upon a shaft, 36, with a lever-arm, 37, and a rod, 38, to the treadle 39, so that when the operator places his foot upon the treadle 39 the rack 30 and plunger $Q^2$ are brought down to discharge the tobacco from the mold, and when the treadle is released the spring in the spring-barrel 32 revolves the wheel 31, drawing up the rack 30 and plunger $Q^2$ and restoring the parts to their normal position.

The mold H is of a shape approximating the shape of the finished cigar, and in order to direct the tobacco into the mold, whether it may be long or short, the chute $N^2$ is made in two parts, the portion 40 being a fixture and the portion 41 hinged thereto at 42, near the upper end of the chute, the sides of the portion 41 lapping past the sides of the portion 40 and being slotted for the reception of the clamping screws and nuts 43. By this means the opening at the lower end of the chute $N^2$ may be made longer or shorter, so that the tobacco will be properly and uniformly distributed as it falls into the mold H, and the tobacco will not fall on the outside of this mold H.

By these improvements the operator is enabled to supply and measure the tobacco with great rapidity and by an automatic operation in harmony with the machine that applies the binder around the filler-tobacco.

The mold $P^2$ is of the ordinary character made use of in tobacco-factories; but it is held in a slightly-inclined position against the notched bar $R^2$, that is fastened upon the top of the table $A^2$, and there is a bridle, 45, hinged at its lower ends to the mold $P^2$, and having a cross-bar at its upper ends entering one of the notches in the back of the inclined bar $R^2$, and the position of the parts is such that the operator can commence to insert the bunches in the top recesses of the mold $P^2$, and this mold $P^2$ can be raised from time to time by swinging the bridle 45 backwardly, lifting the mold, and then restoring the cross-bar of the bridle into one of the higher notches in the bar $R^2$, so that the mold can be easily adjusted and held in a convenient position for the insertion of the bunches successively.

I claim as my invention—

1. The combination, with the hopper $B^2$, for containing the filler-tobacco, and the bunching-machine for rolling the binder around the filler-tobacco, of the shaft 3, moved by the frame D in the bunching-machine, the shaft $C^2$, and agitators within the hopper $B^2$, and the beveled gearing, ratchets, and pawls for connecting the shaft $C^2$ to the shaft 3, substantially as set forth.

2. The combination, with the hopper $B^2$, of a measure beneath an opening in the bottom of the hopper, cut-off plates above the measure and beneath the hopper, and discharge-doors beneath the measure and the levers and cams for giving motion to the cut-off plates and discharge-doors, respectively, and the chute $N^2$ and mold H, substantially as set forth.

3. The combination, with the hopper $B^2$, the measure $D^2$, and the cut-off plates and discharge-doors, of a delivery-chute made in two parts and hinged together near the upper end, so as to vary the length of the opening at the bottom end of the chute, substantially as set forth.

4. The combination, with the cigar-bunching machine and the mold for holding tobacco, of a plunger, a rack and wheel for moving the same vertically, a spring-barrel for giving motion to the wheel in one direction, and a pinion, segmental rack, and treadle for giving motion in the other direction, substantially as set forth.

Signed by me this 12th day of August, A. D. 1887.

SIMON HENRY.

Witnesses:
GEO. T. PINCKNEY,
W. L. SERRELL.